3,644,577
VINYL HALIDE POLYMERIC BLENDS

Yoon Chai Lee and Quirino A. Trementozzi, Springfield, Mass., assignors to Monsanto Company, St. Louis, Mo.
No Drawing. Filed Dec. 11, 1968, Ser. No. 783,096
The portion of the term of the patent subsequent to June 24, 1986, has been disclaimed
Int. Cl. C08f 29/22, 29/56, 41/12
U.S. Cl. 260—876 R                         15 Claims

ABSTRACT OF THE DISCLOSURE

A polymeric blend is prepared from a vinyl halide polymer and an interpolymer formed from a major amount of an ethylenically unsaturated nitrile monomer and a minor amount of copolymerizable monomer from the group of monovinylidene aromatic hydrocarbons, acrylic acids, acrylic esters and vinyl esters. The blends exhibit significantly improved barrier properties in addition to heat resistance and processability, while maintaining or improving other properties including toughness.

BACKGROUND OF THE INVENTION

Vinyl halide homopolymers and copolymers have attained a position of considerable significance in industrial and consumer applications. Although the vinyl halide resins exhibit many desirable properties, the balance of properties therein may not be optimum for various applications or processing techniques. Thus, in some cases certain highly desirable processing characteristics are obtained in a given composition at the sacrifice of physical properties of the final product, and vice versa; these factors tend to limit the applications in which vinyl halide resins are useful.

It has been heretofore observed that certain advantages were obtainable in processing by utilizing blends of different vinyl halide polymers. Such blends exhibited desirable flow properties and good physical properties, however, there has been some sacrifice of the most desirable characteristics of the individual components. It has also been recognized that vinyl halide copolymers may be produced which have heat resistance properties intermediate the values of homopolymers produced from the monomers involved. Such copolymers are often difficult or expensive to produce and generally do not retain all of the advantageous properties of the vinyl halide polymers. Moreover, the polymers and copolymers of vinyl halides may not, in many cases be used in application in which low values of oxygen permeability are required, since they are normally quite deficient in such barrier properties, or the good barrier properties are obtained only with rather severely detrimental effects on processing characteristics.

Accordingly, it is an object of the present invention to provide novel physical blends of vinyl halide polymers wherein a desirable balance of properties is obtained and which have improved processing characteristics and barrier properties.

It is also an object to provide such improved blends wherein toughness is also enhanced.

Another object is to provide polyvinyl halide blends in which heat resistance is maintained at least at the level of the vinyl halide polymeric component, while improvements in processability and barrier properties are obtained.

Still another object is to provide novel blends of vinyl halide polymers from which superior molded and extruded products can be produced conveniently and relatively economically.

SUMMARY OF THE INVENTION

It has now been found that the foregoing and related objects can be readily attained in a blend comprising about 60.0 to 95.0 percent by weight of a vinyl halide polymer and about 40.0 to 5.0 percent by weight of a relatively compatible interpolymer blended therewith. The interpolymer consists essentially of 0.0 to about 25.0 percent by weight of a preformed rubbery graft substrate and 100.0 to about 75.0 percent by weight of a copolymerization product of ethylenically unsaturated nitrile monomers and a copolymerizable monomer, the nitrile and copolymerizable monomers being present in a ratio of their respective weights from about 2.0 to 19.0:1.0. The nitrile of the interpolymer is selected from the group consisting of acrylonitrile, methacrylonitrile, ethacrylonitrile and mixtures thereof, and the copolymerizable monomer is selected from the group consisting of monovinylidene aromatic hydrocarbons, acrylic acids, acrylic esters, vinyl esters and mixtures thereof. At least 60.0 percent by weight of the interpolymer is provided by ethylenically unsaturated nitrile monomer.

The blend may include up to 25 weight percent of a preformed rubbery polymer which may be introduced in an ungrafted state when sufficiently compatible with the vinyl halide polymer. The vinyl halide polymer may comprise a homopolymer of a vinyl halide, a copolymer thereof with another ethylenically unsaturated monomer, a graft copolymer wherein a preformed rubbery polymer serves as a graft substrate for the polymerized vinyl halide, or a post-halogenated polymerized vinyl halide.

DESCRIPTION OF THE PREFERRED EMBODIMENTS

As indicated, the blends of the present invention comprise a vinyl halide polymer and an interpolymer formed essentially from a major amount of an ethylenically unsaturated nitrile monomer and a minor amount of a monomer copolymerizable therewith. Although the vinyl halide polymer and the interpolymer may be blended in the amounts hereinbefore set forth, preferably the amount of vinyl halide polymer is about 70.0 to 90.0 percent and the amount of interpolymer is about 30.0 to 10.0 percent, both based upon the weight of the blend. In addition to these two necessary components, other polymers, impact modifiers, inert fillers, stabilizers, plasticizers, pigments, etc., may be incorporated in the blends.

THE VINYL HALIDE POLYMER

The vinyl halides which are suitable for use in the vinyl halide polymer are vinyl chloride and vinyl fluoride; vinyl chloride is the preferred monomer and may be used alone or in combination with vinyl fluoride and/or another ethylenically unsaturated compound copolymerizable therewith. In the case of a copolymer with another ethylenically unsaturated compound, the amount of comonomer generally does not exceed about 25 percent of the weight of the resulting vinyl halide polymer, and preferably the amount of the second component is less than about 15 percent of the product.

Ethylenically unsaturated monomers which may be interpolymerized with the vinyl halides include vinylidene halides such as vinylidene chloride; vinyl esters such as vinyl acetate; acrylic and alpha-alkyl acrylic acids such as acrylic and methacrylic acids; the alkyl esters of such acrylic or alkyl-acrylic acids such as methyl acrylate, ethyl acrylate, methyl methacrylate; amides of acrylic and alkyl-acrylic acids such as acrylamide, methacrylamide; unsaturated nitriles such as acrylonitrile, methacrylonitrile, ethacrylonitrile; monovinylidene aromatic hydrocarbons such as styrene and alpha-alkyl styrenes; dialkyl esters of maleic acid such as dimethyl maleate and the corresponding fumarates; vinyl alkyl ethers and ketones, and various other ethylenically unsaturated compounds copolymerizable with the vinyl halides. Mixtures of compounds exemplified by the foregoing materials may also be used to form the vinyl halide polymer.

A portion of the vinyl halide monomer may be grafted onto a rubbery substrate if so desired by reacting the monomers in the presence of a preformed rubbery polymer. Exemplary polyolefins which may be used as the rubbery polymer are polyethylene, chlorinated polyethylene, chlorosulfonated polyethylene, higher homologs of polyethylene which may be similarly modified, ethylene/propylene copolymers, ethylene/propylene terpolymers containing a third monomer providing a residual unsaturation, and other interpolymers of the lower olefins. Of considerable value in these blends are interpolymers of the olefins such as ethylene/acrylate and ethylene/vinyl acetate copolymers, and particularly desirable results are obtained when a graft of vinyl chloride upon chlorinated polyethylene or ethylene/vinyl acetate is employed.

The term "vinyl halide polymer" as used herein includes the graft copolymers as well as the ungrafted vinyl halide homopolymers and copolymers. The term also includes the post-halogenated vinyl halide polymers, such as chlorinated polyvinyl chloride, which derive particular benefit from blending with the interpolymers described in terms of processability. Thus, although the halogenated polymers normally possess very good heat resistance, their high melt viscosities tend to limit the methods by which it is practical to fabricate them. The present blends effect a significant reduction in melt viscosity while at least maintaining the beneficial heat resistance and other properties of these polymers.

The method used to prepare the vinyl halide resins may be any which is commonly practiced in the art; the polymerization may be effected *en masse*, in solution or with the monomer in aqueous dispersion. From the standpoint of economics and process control, highly suitable polymers can be prepared by a method in which the monomer reactants are suspended in water. Other variations upon the polymerization method may also be utilized in order to vary the properties of the product; e.g., highly fluid resins can be prepared by polymerization at relatively high temperatures to produce polymers of low crystallinity, or by continuously feeding the monomer charge or a portion thereof to the reaction vessel.

The interpolymer

The interpolymer which is blended with the vinyl halide polymer to attain the objects of this invention contains about 75.0 to 100.0 percent by weight of the copolymerization product of ethylenically unsaturated nitrile and the monomer or monomers copolymerizable therewith. Although copolymerization products containing monomers other than or in addition to those specified can be produced, the presence of such monomers may detract from the overall balance of properties and characteristics desired.

The nitrile and copolymerizable monomer are present in the interpolymer in a weight ratio of about 2.0 to 19.0:1.0, and preferably the ratio thereof in the interpolymer is about 4.0 to 9.0:1.0. As has been indicated, the interpolymer may include up to about 25.0 percent of a preformed rubbery polymer upon which the copolymerization product is at least in part grafted, but if the interpolymer contains less than about 75.0 percent of the copolymerization product the desirable balance of properties and the objectives of the invention are not sufficiently realized. Preferably, when the interpolymer includes a rubbery graft substrate, that component comprises about 10.0 to 15.0 percent by weight thereof. The nitrile:comonomer ratio must be maintained within the limits indicated in order to achieve the desired balance of processability, barrier properties and other characteristics which the invention provides, and for the same reason the nitrile should constitute at least about 60.0 weight percent of the interpolymer, it being appreciated that the rubbery substrate may furnish a portion of the nitrile requirement. Maintaining the ratio of nitrile to copolymerzable monomer above about 2.1:1.0 is particularly important if the ultimate blend is to exhibit the level of resistance to gas permeation which is desired.

Although it is possible to obtain some benefits using acrylonitrile or a mixture thereof with ethacrylonitrile to provide the entire amount of nitrile necessary to produce the interpolymer, methacrylonitrile preferably constitutes at least about 50.0 and peferably at least about 70.0 weight percent of the nitrile monomer constituent; for many purposes it is best to employ methacrylonitrile as the sole nitrile monomeric constituent of the interpolymer because a greater variety of monomers may be copolymerized therewith so as to provide the maximum benefits of the present invention.

The copolymerizable monomers which are advantageously utilized with the nitrile constituent are the monovinylidene aromatic hydrocarbons such as styrene, the alpha-alkyl styrenes and the ring chlorinated anologs thereof, styrene and/or alpha-methyl styrene being preferred; the acrylic acids, such as acrylic acid, methacrylic acid and ethacrylic acid; the acrylic esters, such as methyl acrylate, ethyl acrylate, methyl methacrylate and ethyl ethacrylate; and the vinyl esters such as vinyl formate, vinyl acetate, and vinyl propionate. When acrylonitrile furnishes the nitrile component good results are obtained with any of the foregoing comonomers, but copolymerization of a vinyl or acrylic ester therewith produces the most suitable interpolymer for optimum properties. Although the vinyl esters do not copolymerize with methacrylonitrile, outstandingly good results are obtained with the other comonomers suggested, the best products for the present blends being those produced from styrene and/or alpha-methyl styrene.

It should be appreciated that by judicious selection among the various monomers specified and within the limits described, particularly good results may be achieved and that various combinations of components may provide the desired balance of properties. Exemplary of the suitable monomer combinations which may be recated to achieve the objects of the present invention are methacrylonitrile/styrene, methacrylonitrile/acrylonitrile/styrene, methacrylonitrile/alpha-methyl styrene, methacrylonitrile/acrylonitrile/alpha-methyl styrene, acrylonitrile/alpha-methyl styrene, acrylonitrile/vinyl acetate, acrylonitrile/methyl methacrylate, methacrylonitrile/ethacrylonitrile/alpha-methyl styrene, etc.; interpolymers containing four or more monomers may also be used.

As has been mentioned, the interpolymer employed may contain a proportion of preformed rubbery polymer which is grafted with the polymerizable constituents of the interpolymer by effecting the polymerization thereof in the presence of the rubber. This will generally provide not only the graft copolymer but also at least some ungrafted interpolymers since the efficiency of graft polymerization reactions does not usually reach 100 percent. Exemplary of the various rubbers which are suitable for that purpose are conjugated 1,3-diene rubbers, natural rubbers, ethylene-propylene terpolymer rubbers, isobutylene rubbers, other rubbery olefin polymers such as ethylene-vinyl acetate, ethylene-octyl acrylate, other acrylate rubbers such as butyl acrylate, polyisoprene rubbers, and mixtures thereof. It will be appreciated that such rubbers include not only homopolymers of the specifically identified constituents but also interpolymers which may be characterized primarily as the aforementioned rubbers. It will also be appreciated that a preformed portion of the vinyl halide polymer component of the blend may also be a suitable substrate for the copolymerized monomers of the interpolymer, such as polyvinyl chloride, and the use of such an interpolymer may enhance the compatibility and overall balance of properties in the blend.

The preferred substrates, however, are diene rubbers (including mixtures with diene rubbers), i.e., any rubbery polymer (a polymer having a second order transition temperature not higher than 0° centigrade, preferably not higher than −20° centigrade, as determined by ASTM Test D–746–52T) of one or more of the conjugated, 1,3-dienes, e.g., butadiene, isoprene, piperylene chloroprene, etc. Such rubbers include homopolymers of conjugated 1,3-dienes and copolymers thereof with up to an equal amount by weight of one or more copolymerizable monoethylenically unsaturated monomers, such as monovinylidene aromatic hydrocarbons (e.g., styrene, an ar-alkyl styrene, such as the o-, m- and p-methylstyrenes, 2,4-dimethylstyrene, the ar-ethylstyrenes, p-tert-butylstyrene, etc.; an alpha-methylstyrene, alpha-ethylstyrene, alpha-methyl-p-methylstyrene, etc.; vinyl naphthalene, etc.); ar-halo monovinylidene aromatic hydrocarbons (e.g., the o-, m- and p-chlorostyrenes, 2,4-dibromostyrene, 2-methyl-4-chlorostyrene, etc.); acrylonitrile, methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropenyl ketone, etc.); alpha-olefins (e.g., ethylene propylene, etc.); pyridines; vinyl esters (e.g., vinyl acetate, vinyl stearate, etc.); vinyl and vinylidene halides (e.g., the vinyl and vinylidene chlorides and vinylidene chlorides and bromides, etc.); and the like.

A preferred group of rubbers are those consisting essentially of 75.0 to 100.0 percent by weight of butadiene and/or isoprene and up to 25.0 percent by weight of a monomer selected from the group consisting of monovinylidene aromatic hydrocarbons (e.g., styrene), and unsaturated nitriles (e.g., acrylonitrile), or mixtures thereof. Particularly advantageous substrates are butadiene homopolymers or interpolymers of 90.0 to 95.0 percent by weight butadiene and 5.0 to 10.0 percent by weight of acrylonitrile or styrene.

OPTIONAL COMPONENTS

The blends of the present invention can be comprised soley of the vinyl halide polymer and the incorporated interpolymer and graft copolymers thereof. However, significant advantages are often realized when additional components are also included in the blends. If the interpolymer is not a graft copolymer or graft polymerization blend, it is particularly desirable to admix an impact modifier with the other two components to further improve the physical properties of the products produced from the blends, such as toughness, even though desirable physical improvements may be obtained simply by blending the interpolymer with the vinyl halide polymer. Although ungrafted olefin polymers may be used as the impact modifier such as chlorinated polyethylene, chlorosulfonated polyethylene and ethylene-vinyl acetate copolymers, generally diene rubber grafts of the ABS (styrene and acrylonitrile grafted upon a rubbery diene substrate) and MBS (styrene and methyl methacrylate grafted upon a rubbery diene substrate) types are preferable.

Regardless of the source or mode of introduction of the rubbery polymer, the total amount thereof should not exceed 25 percent of the total weight of the blend, and preferably not more than 15 percent. However, in order to obtain desirable impact modification, it is generally necessary to incorporate at least about 3 percent by weight thereof, and preferably at least 5 percent.

Other optional additives may also be included in the blends of the invention, such as fillers, plasticizers, stabilizers, lubricants and processing aids. Such additives may or may not be desirable, depending upon the characteristics of the blend and upon the optimum balance between economy and properties which can be attained thereby.

BLENDING TECHNIQUES

The blends of the present invention may be prepared by any of the conventional processing techniques and the design of the apparatus used therefor may vary considerably. It is possible to initially blend the components utilizing suitable equipment, such as a Banbury mixer, mill rolls, etc., to form a preliminary blend, which is then divided and utilized as a feedstock for an extruder or other forming apparatus. Alternatively, the blend may be formed directly in an extruder without any preliminary processing, in which case both the interpolymer and the vinyl halide polymer are advantageously introduced as a powder or other particulate form. As an additional possibility, the blend may be prepared by effecting the polymerization of the monomers providing the vinyl halide polymer in the presence of the interpolymer, so as to graft a portion thereof thereupon. This may provide increased benefits to the blend in terms of achieving the optimum properties therein.

The conditions of molding or extrusion are generally the same as those which are used for comparable polymers, the processing temperature of the stock normally being in the range of about 150–220° and preferably about 170–200° centigrade. However, these factors will depend somewhat upon the components and resultant blend properties, and, for example, higher processing temperatures will normally be used if the vinyl halide polymer is, or includes a significant amount of, a halogenated vinyl halide.

Exemplary of the efficacy of the present invention are the following specific examples wherein all parts and percentages are on a weight basis unless otherwise specified.

EXAMPLE 1

A dry formulation is prepared by admixing about 72 parts of polyvinyl chloride resin (PVC) with about 2.5 parts of commercial tin stabilizers, about 1.5 parts of a lubricant and about 24 parts of a modifying interpolymer. The interpolymer is prepared by the free radical copolymerization of methacrylonitrile with alpha-methyl styrene, the ratio of the respective weights thereof in the interpolymer being about 5.7:1.0. The formulation is then mill rolled at about 150–165° centigrade for about 5 minutes after fusion occurs, after which the blend is removed from the rolls and allowed to solidify. The solidified blend is ground and a portion thereof is compression molded to produce specimens for testing.

A comparison of the melt viscosity of the modified formulation with that of a comparable blend from which the modifying interpolymer is omitted shows that processability is improved considerably by the presence of the interpolymer. Moreover, the glass transition temperature of the modified formulation is raised about 2 centigrade degrees by the incorporation of the interpolymer from that of the polyvinyl chloride without it.

A second portion of the ground, solidified blend is formed into sheets in a heated hydraulic press, and the sheets are tested for oxygen permeability. Whereas the unmodified PVC resin has an oxygen permeability value of about 10 cc./100 sq. in 24 hr. atmos. mil at 73° Fahrenheit, the value of the blend containing the interpolymer is about 5–6 cc. of oxygen under the same conditions.

EXAMPLE 2

Three additional blends are prepared and tested as in Example 1, however different interpolymers are used, and the respective amounts of PVC and interpolymer are 85 and 11 parts. A blend designated A is made with an interpolymer containing methacrylonitrile and alpha-methyl styrene in a weight ratio of about 3.0:1.0, a second blend designated B contains the same components in a ratio of about 10.0:1.0, and the third blend, designated C, includes methacrylonitrile and alphamethyl styrene in the same ratio as in blend B, but also includes about 14.0 percent, based upon the weight of the interpolymer, of a butadiene/styrene (80/20) rubber partially grafted with the copolymerized monomers. All blends are found to exhibit better resistance to oxygen permeation, improved heat distortion and better processing characteristics than the PVC formulation unmodified with the several interpolymers. In addition, the interpolymer used in blend C improves the toughness of the base resin by about 2.0 foot pounds per square inch of notch, as measured by an Izod Impact test.

EXAMPLE 3

The procedures of Example 1 are repeated, but the interpolymer employed therein is replaced by several different interpolymers. The interpolymers used are tabulated in Table 1 below; in each instance the values for oxygen permeation and processibility are better than in the PVC formulation unmodified with the interpolymer, and the heat distortion temperature is usually higher, but is at least as good as that of the base resin.

TABLE 1

| Interpolymer | Components | Proportion (weight) |
|---|---|---|
| A | MAN/S | 11.5:1.0 |
| B | MAN/AN/S | 3.0:1.0:1.0 |
| C | MAN/AN/AMS | 1.6:1.4:1.0 |
| D | AN/AMS | 2.0:1.0 |
| E | MAN/AMS/S | 17.0:2.0:1.0 |
| F | MAN/S/R | 6.0:3.0:1.0 |
| G | AN/VA | 4.0:1.0 |
| H | MAN/AN/MMA | 2.5:6.5:1.0 |
| I | MAN/EAN/AMS | 6.5:0.65:1.0 |

NOTE.—MAN=methacrylonitrile. S=styrene. AN=acrylonitrile. AMS=alpha-methylstyrene. R=butadiene/acrylonitrile (90/10) rubber. VA=vinyl acetate. MMA=methyl methacrylate. EAN=ethacrylonitrile.

EXAMPLE 4

The procedure of Example 1 is again repeated, substituting however about 80 parts of a chlorinated polyvinyl chloride resin containing about 65.0 percent by weight of chlorine for the PVC resin employed therein, and the amount of interpolymer is reduced to about 16 parts. The formulation thus produced is considerably improved in processability (compared to blends of the chlorinated polyvinyl chloride without the interpolymer); molded specimens from the blends are quite clear, the resistance to oxygen permeation is very good and there is no appreciable decrease in heat distortion temperature.

EXAMPLE 5

A blend comparable to that designated C in Example 2 is prepared, however polyvinyl chloride is substituted for the butadiene/styrene rubber employed as the graft substrate in the interpolymer thereof. Comparable results are achieved in terms of improvement in heat distortion temperature and permeation resistance, and the molded specimen exhibits somewhat better clarity than that exhibited by blend C.

EXAMPLE 6

A polymer blend is prepared by effecting the polymerization of about 85 parts of vinyl chloride monomer in the presence of about 15 parts of an interpolymer containing about 90 percent of methacrylonitrile and about 10 percent of styrene. About 2.5 parts of a commercial tin stabilizer and about 1.25 parts of a lubricant are thereafter blended with the polymerization product, and the blend is mill rolled, solidified, ground and compression molded as is hereinbefore described. Processability of the blend is very good and the molded specimens exhibit an improved level of resistance to heat, compared to blends prepared without an interpolymer included. Sheets prepared from the same blend are also made and compared with sheets from unmodified PVC; these are found to have a very significantly improved level of resistance to oxygen permeation, and the levels of the clarity in all molded products are very good.

Thus, it can be seen that the present invention provides novel blends of vinyl halide polymers wherein a desirable balance of physical properties and processing characteristics is obtained. Generally, the blends exhibit outstanding processing characteristics coupled with good barrier properties and improved heat resistance, and in many instances toughness is also enhanced. In any event, heat resistance is at least maintained at the level of the vinyl halide polymeric component of the blend while improvements in processability and barrier properties are obtained. Superior molded and extruded products can be produced conveniently and relatively economically from the novel blends of the invention.

What is claimed is:

1. A vinyl halide polymer blend comprising about 60.0 to 95.0 percent by weight of a vinyl halide polymer and about 40.0 to 5.0 percent by weight of a relatively compatible interpolymer blended therewith, said vinyl halide polymer selected from the group consisting of vinyl chloride homopolymers, vinyl fluoride homoplymer, vinyl chloride copolymers, vinyl fluoride copolymers, graft copolymers of vinyl chloride, graft copolymers of vinyl fluoride, post-chlorinated vinyl chloride and post-fluorinated vinyl fluoride; said copolymers of vinyl chloride and vinyl fluoride containing up to about 25 percent by weight of at least one copolymerizable comonomer; said interpolymer consisting essentially of 0.0 to about 25.0 percent by weight of a preformed rubbery graft substrate and 100 to about 75.0 percent by weight of a copolymerization product of ethylenically unsaturated nitrile monomer and a copolymerizable monomer in a ratio of their respective weights of about 2.0 to 19.0:1.0, said nitrile monomer being selected from the group consisting of acrylonitrile, methacrylonitrile, ethacrylonitrile and mixtures thereof, and said copolymerizable monomer being selected from the group consisting of monovinylidene aromatic hydrocarbons, acrylic acids, acrylic esters, vinyl esters and mixtures thereof, at least 60.0 percent by weight of said interpolymer being provided by said ethylenically unsaturated nitrile monomer.

2. The blend of claim 1 wherein about 3-25 percent, based upon the total weight of said blend, of a preferred rubbery polymer, is included.

3. The blend of claim 1 wherein said vinyl halide polymer is polyvinyl chloride.

4. The blend of claim 1 wherein said vinyl halide polymer comprises a copolymer of vinyl chloride monomer with about 5-25 percent by weight of said copolymer of another ethylenically unsaturated monomer copolymerizable therewith.

5. The blend of claim 1 wherein said vinyl halide polymer is chlorinated polyvinyl chloride.

6. The blend of claim 2 wherein said rubbery polymer is a diene polymer and wherein at least a portion of said interpolymer is grafted upon said rubbery diene polymer.

7. The blend of claim 2 wherein said rubbery polymer is an olefin polymer and wherein a portion of said vinyl halide polyer is grafted onto said olefin polymer.

8. The blend of claim 1 wherein methacrylonitrile comprises at least about 50 percent of the weight of said nitrile monomer and wherein said copolymerizable monomer is a monovinylidene aromatic hydrocarbon selected from the class consisting of styrene, alpha-methyl styrene and mixtures thereof.

9. The blend of claim 8 wherein methacrylonitrile comprises at least about 70 percent of the weight of said nitrile monomer and wherein the ratio of nitrile to copolymerizable monomer is about 4.0 to 9.0:1.0.

10. The blend of claim 1 comprising about 70.0 to 90.0 percent by weight of said vinyl halide polymer and about 30.0 to 10.0 percent by weight of said relatively compatible interpolymer.

11. A vinyl halide polymer blend comprising about 70.0 to 90.0 percent by weight of a vinyl halide polymer and about 30.0 to 10.0 percent by weight of a relatively compatible interpolymer blended therewith, said vinyl halide polymer selected from the group consisting of vinyl chloride homopolymers, vinyl fluoride homopolymers, vinyl chloride copolymers, vinyl fluoride copolymers, graft copolymers of vinyl chloride, graft copolymers of vinyl fluoride, post-chlorinated vinyl chloride and post-fluorinated vinyl fluoride; said copolymers of vinyl chloride and vinyl fluoride containing up to about 25 percent by weight of at least one copolymerizable comonomer; said interpolymer consisting essentially of about 0.0 to 15.0 percent by weight of a preformed rubbery graft substrate and about 100 to 85.0 percent by weight of a copolymerization product of ethylenically unsaturated nitrile monomer and a copolymerizable monovinylidene aromatic hydrocarbon in a ratio of their respective weights of about 4.0 to 9.0:1.0, said nitrile monomer being selected from the group consisting of methacrylonitrile monomer and mixtures of methacrylonitrile monomer with up to about 30.0 percent of acrylonitrile, based upon the weight of said mixture, at least 60.0 percent by weight of said interpolymer being ethylenically unsaturated nitrile monomer.

12. The blend of claim 11 wherein said vinyl halide polymer is polyvinyl chloride.

13. The blend of claim 11 wherein said monovinylidene aromatic hydrocarbon is selected from the group consisting of styrene, alpha-methylstyrene and mixtures thereof.

14. The blend of claim 13 wherein said nitrile is methacrylonitrile and said aromatic hydrocarbon is alpha-methylstyrene.

15. The blend of claim 13 wherein said interpolymer contains about 10.0 to 15.0 percent by weight of a preformed diene polymer graft substrate.

References Cited

UNITED STATES PATENTS

| | | | |
|---|---|---|---|
| 2,802,809 | 8/1957 | Hayes | 260—880 |
| 3,322,857 | 5/1967 | Coaker et al. | 260—876 |
| 3,322,858 | 5/1967 | Coaker et al. | 260—876 |
| 3,438,971 | 4/1969 | Walker | 260—876 |
| 3,451,538 | 6/1969 | Trementozzi | 260—876 |

FOREIGN PATENTS

| | | | |
|---|---|---|---|
| 722,769 | 11/1965 | Canada | 260—876 |

MURRAY TILLMAN, Primary Examiner

H. W. ROBERTS, Assistant Examiner

U.S. Cl. X.R.

260—4 R, 878 R, 879, 880 R, 881, 891, 898